(12) United States Patent
Ryu et al.

(10) Patent No.: US 11,425,456 B2
(45) Date of Patent: Aug. 23, 2022

(54) ELECTRONIC DEVICE FOR PLAYING HIGH DYNAMIC RANGE VIDEO AND METHOD THEREOF

(71) Applicant: SAMSUNG ELECTRONICS CO., LTD., Suwon-si (KR)

(72) Inventors: Jinbong Ryu, Suwon-si (KR); Minki Kim, Suwon-si (KR); Jimin Kim, Suwon-si (KR); Hyungsuk Kim, Suwon-si (KR); Hyuntaek Lee, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/778,161

(22) Filed: Jan. 31, 2020

(65) Prior Publication Data

US 2020/0252687 A1 Aug. 6, 2020

(30) Foreign Application Priority Data

Feb. 1, 2019 (KR) .......................... 10-2019-0013216

(51) Int. Cl.
*H04N 5/765* (2006.01)
*H04N 21/4402* (2011.01)
(Continued)

(52) U.S. Cl.
CPC ..... *H04N 21/440218* (2013.01); *H04N 9/642* (2013.01); *H04N 9/87* (2013.01); *H04N 21/435* (2013.01)

(58) Field of Classification Search
USPC ........................................................ 386/200
See application file for complete search history.

(56) References Cited

U.S. PATENT DOCUMENTS 9,300,938 B2 3/2016 Atkins
9,591,257 B2 3/2017 Oh et al.
(Continued)

FOREIGN PATENT DOCUMENTS

CN 106030503 10/2016
KR 10-2017-0106022 9/2017
(Continued)

OTHER PUBLICATIONS

International Search Report and Written Opinion dated May 25, 2020 in counterpart International Patent Application No. PCT/KR2020/001540.
(Continued)

*Primary Examiner* — Nigar Chowdhury
(74) *Attorney, Agent, or Firm* — Nixon & Vanderhye, P.C.

(57) ABSTRACT

An electronic device is provided. The electronic device includes communication circuitry configured to communicate with an external electronic device, a processor operatively connected with the communication circuitry, and a memory operatively connected with the processor. The memory may store instructions which, when executed, cause the processor to control the electronic device to: obtain environment information associated with a video playback environment of the external electronic device, decode a high dynamic range (HDR) video, perform color conversion of the decoded HDR video based on the environment information, encode the color-converted video into a standard dynamic range (SDR) format, and transmit the encoded video to the external electronic device via the communication circuitry.

6 Claims, 13 Drawing Sheets

(51) Int. Cl.
*H04N 21/435* (2011.01)
*H04N 9/64* (2006.01)
*H04N 9/87* (2006.01)

(56) References Cited

U.S. PATENT DOCUMENTS

| | | | |
|---|---|---|---|
| 10,033,958 B2 * | 7/2018 | Terada | H04N 7/01 |
| 10,192,294 B2 | 1/2019 | Tsuru et al. | |
| 10,194,127 B2 | 1/2019 | Atkins | |
| 10,212,429 B2 | 2/2019 | Guo et al. | |
| 10,264,266 B2 | 4/2019 | Pan | |
| 10,271,054 B2 | 4/2019 | Greenebaum et al. | |
| 10,275,865 B2 | 4/2019 | Nam | |
| 10,306,307 B2 | 5/2019 | Sanders et al. | |
| 10,560,707 B2 * | 2/2020 | Atkins | H04N 19/85 |
| 10,582,227 B2 * | 3/2020 | He | H04N 21/23439 |
| 10,812,801 B2 | 10/2020 | Tourapis et al. | |
| 10,880,549 B2 | 12/2020 | Greenebaum et al. | |
| 10,887,670 B2 | 1/2021 | Tsukagoshi | |
| 10,986,345 B2 | 4/2021 | Guo et al. | |
| 2013/0114000 A1 | 5/2013 | Atkins | |
| 2015/0243200 A1 * | 8/2015 | Pan | G09G 5/02 |
| | | | 345/590 |
| 2015/0243243 A1 | 8/2015 | Greenebaum et al. | |
| 2016/0044277 A1 | 2/2016 | Oh et al. | |
| 2016/0162259 A1 | 6/2016 | Zhao et al. | |
| 2016/0212397 A1 | 7/2016 | Atkins | |
| 2016/0292834 A1 | 10/2016 | Tsuru et al. | |
| 2017/0070681 A1 * | 3/2017 | Nattress | H04N 19/44 |
| 2017/0142446 A1 * | 5/2017 | Leleannec | H04N 19/196 |
| 2017/0186141 A1 * | 6/2017 | Ha | H04N 9/646 |
| 2017/0330312 A1 | 11/2017 | Nam | |
| 2017/0339418 A1 * | 11/2017 | Ramasubramonian | H04N 19/176 |
| 2018/0007392 A1 * | 1/2018 | Lasserre | H04N 19/85 |
| 2018/0018932 A1 * | 1/2018 | Atkins | G09G 5/026 |
| 2018/0063404 A1 * | 3/2018 | Chen | G06T 5/009 |
| 2018/0063500 A1 * | 3/2018 | Rusanovskyy | G09G 5/04 |
| 2018/0070107 A1 * | 3/2018 | Ramasubramonian | H04N 19/186 |
| 2018/0124400 A1 * | 5/2018 | He | H04N 19/46 |
| 2018/0131841 A1 * | 5/2018 | Mahmalat | H04N 1/6005 |
| 2018/0152686 A1 * | 5/2018 | Wozniak | H04N 7/147 |
| 2018/0152721 A1 * | 5/2018 | Rusanovskyy | H04N 19/46 |
| 2018/0220101 A1 * | 8/2018 | Evans | H04N 7/0117 |
| 2018/0249166 A1 * | 8/2018 | Leleannec | H04N 19/186 |
| 2018/0262819 A1 * | 9/2018 | Tsukagoshi | H04N 21/4347 |
| 2018/0330674 A1 * | 11/2018 | Baar | H05B 45/20 |
| 2018/0359495 A1 * | 12/2018 | Oh | H04N 21/4348 |
| 2018/0376173 A1 * | 12/2018 | Tsukagoshi | H04N 21/2353 |
| 2019/0037250 A1 * | 1/2019 | Tsukagoshi | H04N 19/33 |
| 2019/0045156 A1 * | 2/2019 | Oh | H04N 7/56 |
| 2019/0058855 A1 * | 2/2019 | Uchimura | G11B 27/28 |
| 2019/0058886 A1 * | 2/2019 | Chen | H04N 19/1887 |
| 2019/0089956 A1 * | 3/2019 | Stessen | H04N 19/30 |
| 2019/0098317 A1 * | 3/2019 | Lu | H04N 19/186 |
| 2019/0130546 A1 * | 5/2019 | Le Naour | H04N 19/86 |
| 2019/0164262 A1 * | 5/2019 | Cellier | G06T 5/009 |
| 2019/0191124 A1 * | 6/2019 | Peng | H04N 7/0125 |
| 2019/0253771 A1 | 8/2019 | Tsukagoshi | |
| 2019/0318448 A1 * | 10/2019 | Giovannelli | H04N 1/60 |
| 2020/0007718 A1 * | 1/2020 | Lee | H04N 5/2355 |
| 2020/0105221 A1 * | 4/2020 | Marcu | G06T 5/009 |
| 2020/0137403 A1 * | 4/2020 | Zhang | H04N 19/186 |
| 2020/0186839 A1 * | 6/2020 | Hiron | H04N 19/186 |
| 2020/0296428 A1 * | 9/2020 | Andrivon | H04N 19/46 |
| 2021/0092495 A1 | 3/2021 | Tsukagoshi | |

FOREIGN PATENT DOCUMENTS

| | | |
|---|---|---|
| KR | 10-2017-0129004 | 11/2017 |
| WO | 2017/115678 | 7/2017 |

OTHER PUBLICATIONS

Communication pursuant to Rule 164(1) EPC dated Jan. 7, 2022 in EP Application No. 20748658.0.

Examination Report dated Mar. 16, 2022 in IN Application No. 202117038971 and English-language translation.

* cited by examiner

ELECTRONIC DEVICE FOR PLAYING HIGH DYNAMIC RANGE VIDEO AND METHOD THEREOF

CROSS-REFERENCE TO RELATED APPLICATION

This application is based on and claims priority under 35 U.S.C. § 119 to Korean Patent Application No. 10-2019-0013216, filed on Feb. 1, 2019, in the Korean Intellectual Property Office, the disclosure of which is incorporated by reference herein its entirety.

BACKGROUND

1. Field

The disclosure relates to technologies causing an electronic device to play a high dynamic range (HDR) video using an external electronic device.

2. Description of Related Art

Various types of display devices have been developed and released to the market. Particularly, technologies of implementing the same high color representation coverage as seeing the scenery with eyes of a user have been developed.

As one method thereof, a display device for generating an HDR video and displaying the HDR video has been developed. HDR is a technology for displaying a video, the shading of which is classified in greater detail, which is similar to recognizing targets with eyes of a person. Technology not using the HDR may be referred to as standard dynamic range (SDR).

Furthermore, to output a video on a large screen as communication technology is developed, technologies of outputting a video stored in an electronic device or a video received from an external server or the like using an external electronic device have come into wide use. The UHD Alliance is an international coalition defines the brightness standard of premium 4K HDR video as 1000 NIT or more, but there are a plurality of displays, each with a brightness range of about 100 NIT for outputting an SDR video. Furthermore, there are several formats for an HDR video, and an electronic device frequently supports only some of the several formats.

When transmitting an HDR video with an SDR format, an electronic device according to an existing technology may cause a difference of sense to a user who recognizes a screen.

The above information is presented as background information only to assist with an understanding of the present disclosure. No determination has been made, and no assertion is made, as to whether any of the above might be applicable as prior art with regard to the present disclosure.

SUMMARY

Embodiments of the present disclosure address at least the above-mentioned problems and/or disadvantages and to provide at least the advantages described below. Accordingly, an example aspect of the present disclosure is to provide a method for providing an HDR video to minimize and/or reduce a sense of difference of a user who recognizes a screen although transmitting an HDR video with an SDR format and an electronic device thereof.

Another example aspect of the present disclosure is to provide a method for providing an HDR video using an external electronic device which supports a different HDR format and an electronic device thereof.

In accordance with an example aspect of the present disclosure, an electronic device is provided. An electronic device may include: communication circuitry configured to communicate with an external electronic device, a processor operatively connected with the communication circuitry, and a memory operatively connected with the processor. The memory may store instructions which, when executed, cause the processor to control the electronic device to: obtain environment information associated with a video playback environment of the external electronic device, decode a high dynamic range (HDR) video, perform color conversion of the decoded HDR video based on the environment information, encode the color-converted video into a standard dynamic range (SDR) format, and transmit the encoded video to the external electronic device via the communication circuitry.

In accordance with another example aspect of the present disclosure, an electronic device is provided. An electronic device may include: communication circuitry configured to communicate with an external electronic device, a processor operatively connected with the communication circuitry, and a memory operatively connected with the processor. The memory may store instructions which, when executed, cause the processor to control the electronic device to: obtain environment information associated with an HDR video playback environment of the external electronic device, request an HDR video from an HDR video providing device via the communication circuitry based on the environment information, receive the HDR video from the HDR video providing device, re-packetize the received HDR video, and transmit the re-packetized HDR video to the external electronic device via the communication circuitry.

In accordance with another example aspect of the present disclosure, a method is provided. A method may include: obtaining environment information associated with a video playback environment of the external electronic device, decoding an HDR video, performing color conversion of the decoded HDR video based on the environment information, encoding the color-converted video into an SDR format, and transmitting the encoded video to the external electronic device.

In accordance with another example aspect of the present disclosure, a method is provided. A method may include: obtaining environment information associated with an HDR video playback environment of the external electronic device, receiving an HDR video from an HDR video providing device based on the environment information, re-packetizing the received HDR video, and transmitting the re-packetized HDR video to the external electronic device.

In accordance with another example aspect of the present disclosure, a non-transitory computer readable storage medium is provided. A non-transitory computer readable storage medium may store a computer program for causing an electronic device to perform the method disclosed in the present disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein can be made without departing from the scope and spirit of the disclosure.

Figure 1:
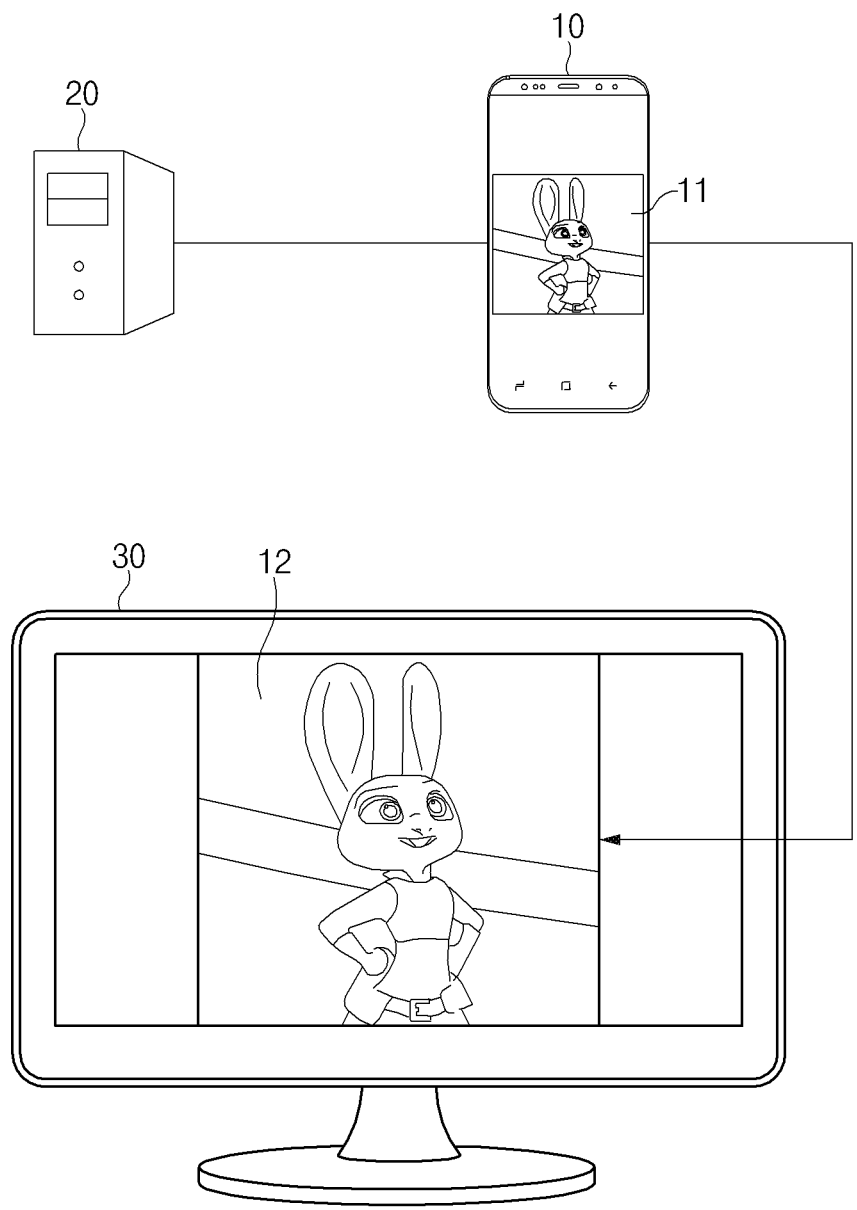
FIG. 1 is a diagram illustrating an example system for playing a video, according to an embodiment.

FIG. 1 is a diagram illustrating an example system for playing a video, according to an embodiment.

An electronic device 10 according to an embodiment may play an HDR video (or HDR content) 11. Playing the video may include, for example, an operation of outputting consecutive images on a display device such as, for example, a liquid crystal display (LCD), a touch screen, an organic light-emitting diode (OLED) panel, a plasma display panel (PDP), or the like. Herein, it is not limited to the type of the display device.

The electronic device 10 may be a device capable of communicating with another device in a wired and/or wireless manner. For example, and without limitation, the electronic device 10 may include a set-top box, a home automation control panel, a security control panel, a media box, a game console, an audio, an e-book reader, a server, a workstation, a personal multimedia player (PMP), an MPEG audio layer 3 (MP3) player, a wearable device, a smartphone, a personal digital assistant (PDA) terminal, a computing device such as a laptop or tablet personal computer (PC), or the like. Herein, it is not limited thereto.

The electronic device 10 may play the HDR video 11 stored in a memory (e.g., a memory 130 of FIG. 2) provided in the electronic device 10 or may receive and play the HDR video 11 from an HDR video providing device 20. In the disclosure, the HDR video may refer, for example, to a video (e.g., a still image or a moving image) configured based on HDR technology.

Herein, the HDR technology may include, for example, a technology for a video, the shading of which is classified in greater detail, which is similar to recognizing targets with eyes of a person. For example, HDR may distinguish brightness up to 1000 nits to represent shading in detail, thus, having the gray scales of the dark portion, which are not more saturated, and having the gray scales of the light portion, which are not more clipped, than the video implemented in a standard dynamic range. SDR may refer, for example, to a manner which represents a video in a standard dynamic range without applying the HDR technology. An SDR video may refer, for example, to a video generated based on the SDR.

The electronic device 10 may play a video 12 corresponding to the HDR video 11 using an external electronic device 30. When the HDR video 11 is streamed, the electronic device 10 may transmit an SDR video or an HDR video (e.g., the video 12), converted based on an output setting value corresponding to the HDR video 11, to the external electronic device 30.

The video 12 output by the external electronic device 30 may have the same or similar contents to the HDR image 11. The electronic device 10 may transmit data for representing the HDR image 11 to the external electronic device 30 through a wired communication cable such as a high definition multimedia interface (HDMI). The electronic device 10 may transmit a bitstream for representing the HDR video 11 to the external electronic device 30 through wireless communication. The wireless communication may refer, for example, and without limitation, to short-range wireless communication, such as a wireless-fidelity (Wi-Fi) mode, a Zigbee mode, a near field communication (NFC) mode, or a Bluetooth mode, or a mobile communication mode, such as $3^{rd}$ generation (3G), $3^{rd}$ generation partnership project (3GPP), a long term evolution (LTE), $5^{th}$ generation (5G), or the like. Herein, the above-mentioned wireless communication modes are merely illustrative, and embodiments are not limited thereto.

The external electronic device 30 may include, for example, and without limitation, a television, a monitor, a tablet personal computer (PC), a smartphone, a laptop, a PC, a portable multimedia player (PMP), a digital photo frame, a digital signage, a device with a display such as a kiosk or a navigation terminal, or the like. Herein, it is not limited thereto.

Depending on a communication environment or a connection scheme, a connection between the electronic device 10 and the external electronic device 30 may fail to support transmission of an image with an HDR format and may only support transmission of an image with an SDR format. In this case, in a process of transcoding the HDR video 11 into an SDR video, the electronic device 10 may convert the HDR image 11 into an SDR format and may transmit the video converted into the SDR format to the external electronic device 30.

When converting the HDR video 11 into the SDR format, the electronic device 10 may perform a conversion process based on an output setting value corresponding to an SDR video. For example, when an HDR video is streamed, the electronic device 10 may generate the video converted into the SDR format, based, for example, and without limitation, on at least one of a maximum luminance (or a luminance range), a gamma curve, a color gamut, a color space of the external electronic device 30, or the like.

Various formats for HDR have been developed. For example, there are formats such as DolbyVision, HDR10, HDR10+, and Hybrid log-gamma (HLG). However, all devices may fail to support all of various HDR formats. There may be an HDR format supportable and an HDR format unsupportable, depending on device specifications. When the external electronic device 30 does not support a format of the HDR video 11 streamed to the electronic device 10 or a format of the HDR video 11 stored in the electronic device 10, although a communication connection between the electronic device 10 and the external electronic device 30 supports transmission of a video with the HDR format, the external electronic device 30 may normally fail to output the video 12.

Thus, the electronic device 10 may request an HDR image of a format supported by the external electronic device 30 from the HDR video providing device 20 or may convert the HDR video 12 into a format supported by the external electronic device 30. In other words, the electronic device 10 may transmit the HDR image to the external electronic device 30 using the format supported by the external electronic device 30.

According to an embodiment, the external electronic device 30 may output the video 12 with image quality of the same or similar level to that of the HDR image 11 without an additional task for the received data.

Figure 2:
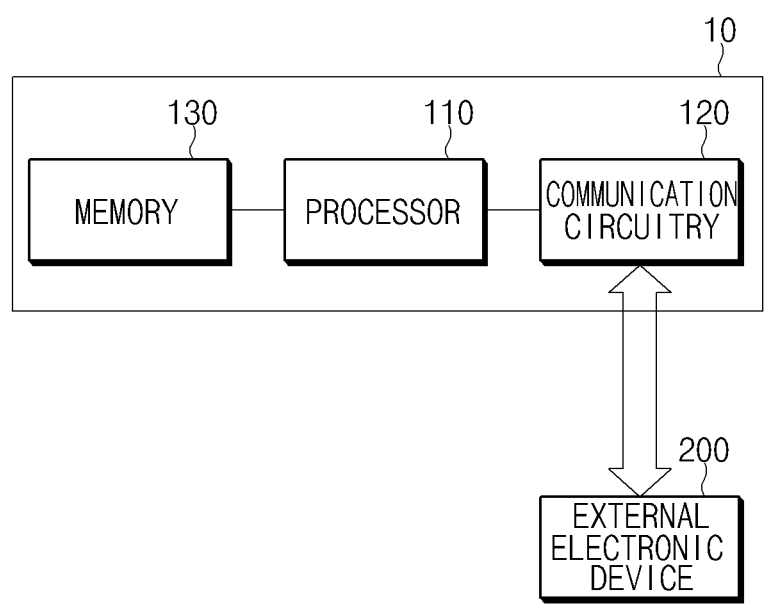
FIG. 2 is a block diagram illustrating an example structure of an electronic device, according to an embodiment.

FIG. 2 is a block diagram illustrating an example structure of an electronic device 10, according to an embodiment. According to FIG. 2, the electronic device 10 may include a processor (e.g., including processing circuitry) 110, a communication circuitry 120, and a memory 130.

The memory 130 may store instructions which, when executed, cause the processor 110 to perform operations performed by the electronic device 10. The processor 110 may execute the instructions to control components of the electronic device 10, or may process data such that operations performed by the electronic device 10 are performed.

The communication circuitry 120 may transmit and/or receive a video under control of the processor 110. For example, the communication circuitry 120 may receive an HDR video or may transmit an HDR video or an SDR video.

Herein, the communication circuitry 120 may receive environment information about an external electronic device 200 (e.g., an external electronic device 30 of FIG. 1) from the external electronic device 200. The environment information may refer, for example, to information associated with a video playback environment in which the external electronic device 200 plays a video (e.g., a video 12 of FIG. 1). For example, and without limitation, the environment information may include color space information of the external electronic device 200 and information about a maximum luminance of the external electronic device 200, or the like. The color space information may include color gamut information and gamma information. For another example, the environment information may include information about a format of an HDR video, supportable by the external electronic device 200.

According to an embodiment, when converting and transmitting an HDR image into an SDR image, because the HDR image is able to have a high luminance value, the external electronic device 200 may suitably fail to represent pixels included in the HDR image. For example, when a maximum screen brightness value included in the HDR image is 1000 nits and when a maximum luminance of the external electronic device 200 is 100 nits, there may occur a problem in which the external electronic device 200 is unable to represent pixels greater than 100 nits. Thus, the processor 110 may convert the HDR video such that the maximum luminance of the video included in the HDR video becomes 100 nits or less.

However, when the luminance of the image included in the HDR video is simply and linearly mapped within a maximum luminance range of the external electronic device 200, representation of the HDR video may fail to be performed normally. For example, a portion representing a dark region of the HDR video may be output in a state where it is difficult to be distinguished and recognized by a user. Thus, the communication circuitry 120 may receive environment information including the color space information of the external electronic device 200 from the external electronic device 200, and the processor 110 may perform color conversion for the HDR video based on the color space information included in the received environment information. The color conversion may, for example, be referred to as color space conversion.

Furthermore, according to another embodiment, the communication circuitry 120 may receive environment information which further includes information about a format of an HDR video, supportable by the external electronic device 200. The processor 110 may request an HDR video configured with a format supportable by the external electronic device 200 from an HDR video providing device (e.g., an HDR video providing device of FIG. 1) via the communication circuitry 120 based on the received environment information.

The processor 110 may include various processing circuitry and re-packetize the HDR video in a form where the communication circuitry 120 may transmit the HDR video to the external electronic device 200 and may transmit the re-packetized HDR video to the external electronic device 200 via the communication circuitry 120.

Figure 3:
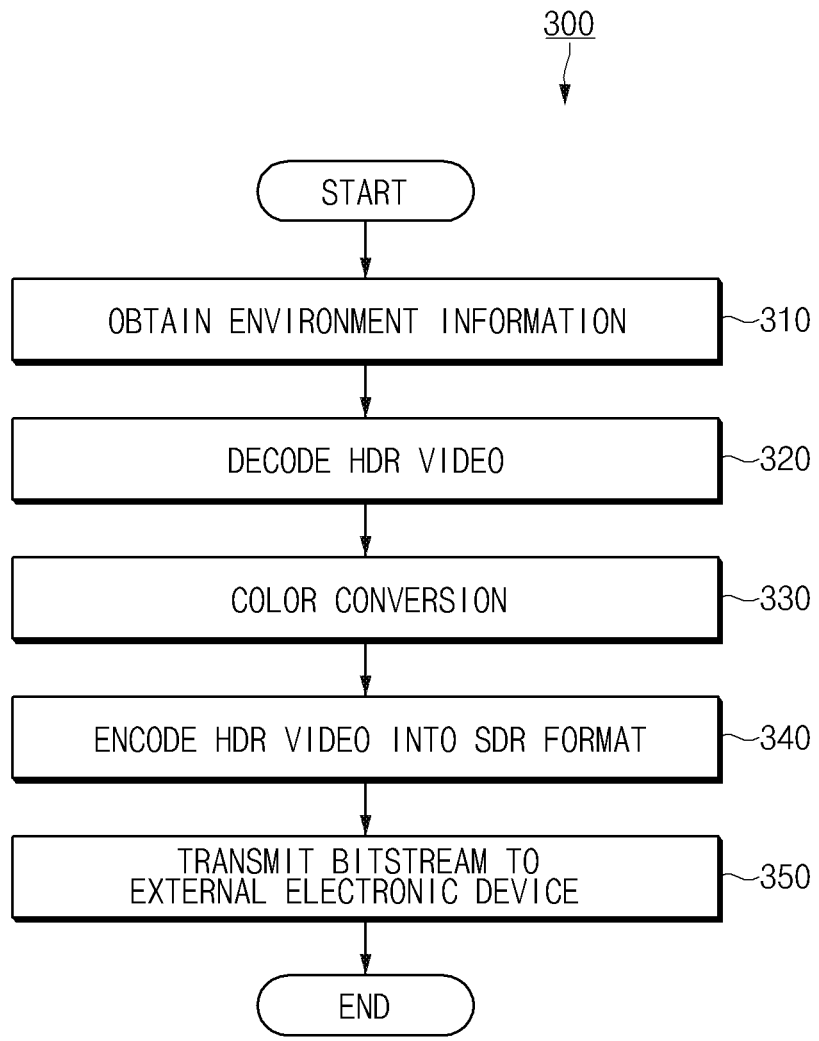
FIG. 3 is a flowchart illustrating an example process of playing an HDR video, according to an embodiment.

FIG. 3 is a flowchart 300 illustrating an example process of playing an HDR video, according to an embodiment.

An electronic device 10 of FIG. 1 may perform operation 310 of obtaining environment information about an external electronic device 30 of FIG. 1. According to an embodiment, the electronic device 10 may perform a capability negotiation process to perform a communication connection to the external electronic device 30 and may receive environment information from the external electronic device 30 in the process of performing the probability negotiation process.

According to another embodiment, when the electronic device 10 wants to play an HDR video on the external electronic device 30, it may transmit a request for environment information to the external electronic device 30. The electronic device 10 may receive the environment information as a response to the request from the external electronic device 30.

According to another embodiment, the electronic device 10 may identify identification information capable of identifying the external electronic device 30 and may search for environment information about the external electronic device 30 using the identification information. Herein, the identification information may refer, for example, to information capable of identifying a type of the external electronic device 30, classified according to a feature of the external electronic device 30. For example, the identification information may include a model name for the external electronic device 30. The electronic device 10 may transmit a query including at least a portion of the identification information to an external server to search for environment information. The electronic device 10 may search for environment information from a table stored in a memory (e.g., a memory 130 of FIG. 2) of the electronic device 10 using at least a portion of the identification information.

Furthermore, the electronic device 10 may perform operation 320 of decoding an HDR video received in an encoded state. Furthermore, the electronic device 10 may perform transcoding for encoding the decoded HDR video into a form capable of being transmitted to the external electronic device 10. Herein, when encoding and transmitting the decoded HDR video without change, large deterioration in image quality or the like included in the HDR video may occur when a playback environment of the external electronic device 30 is not suitable for playing the HDR video. Thus, the electronic device 10 may correct the HDR video based on the environment information about the external electronic device 30 in the process of transcoding the HDR video.

According to an embodiment, to correct the HDR video based on the environment information, the electronic device 10 may perform color conversion operation 330 for the decoded HDR video. Color conversion operation 330 may include, for example, a process of performing color space conversion (CSC). In the color conversion process according to an embodiment, the electronic device 10 may perform tone mapping of a video included in the HDR video, depending on the environment information of the external electronic device 300. To perform the tone mapping, the electronic device 10 may determine a tone mapping coefficient used in the tone mapping process, based on the environment information.

A communication connection between the electronic device 10 and the external electronic device 30 is possible to transmit an SDR video without supporting transmission of an HDR video. Due to a playback environment of the external electronic device 30, it may be impossible to play an HDR video and it is possible to play only an SDR video. To transmit a video to the external electronic device 30 using an SDR format, the electronic device 10 may perform operation 340 of encoding the HDR video, the color conversion of which is completed, into the SDR format. The electronic device 10 may transmit a bitstream including the image encoded into the SDR format to the external electronic device 30 in operation 350.

Figure 4:
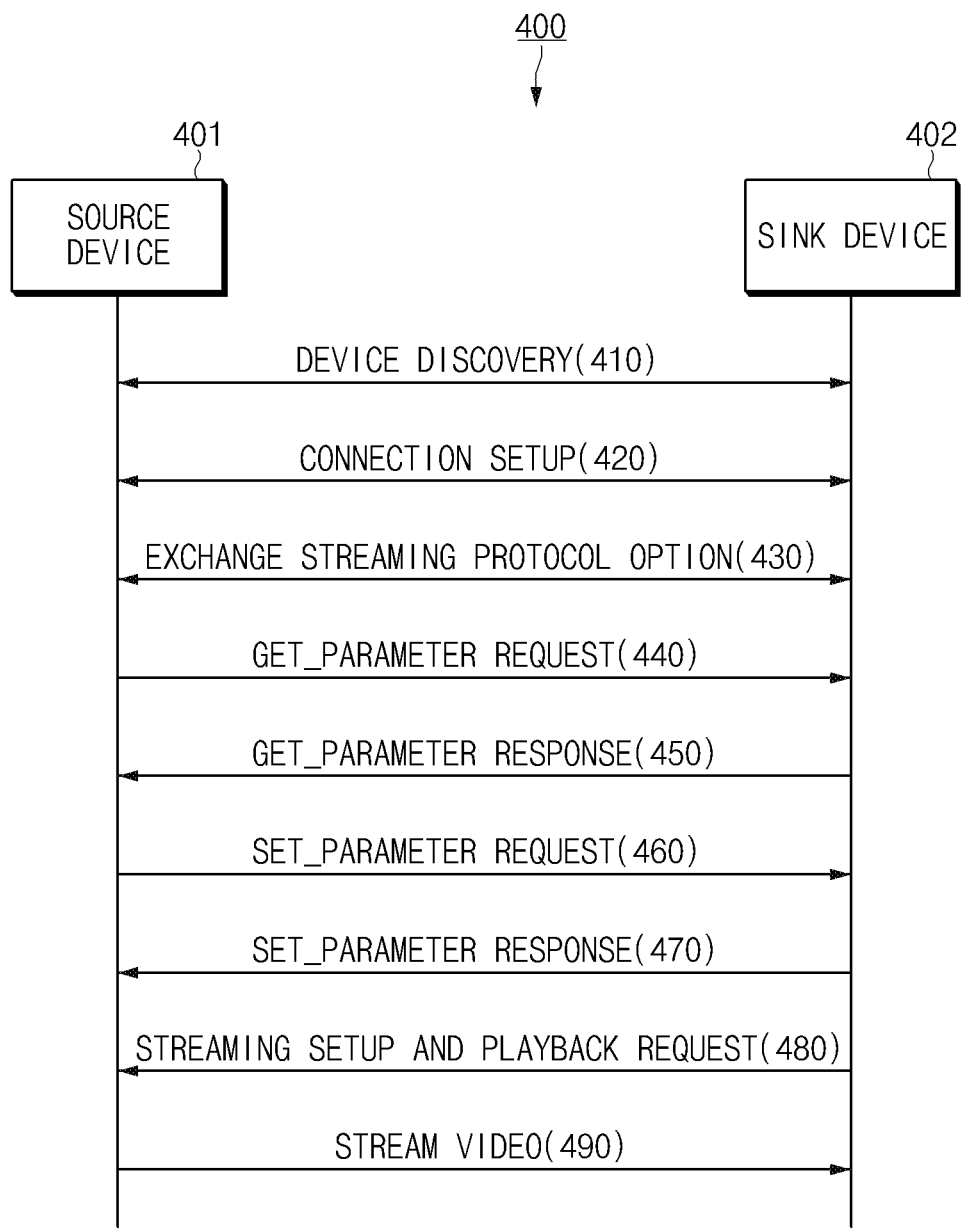
FIG. 4 is a signal sequence diagram illustrating an example process of establishing a connection between a source device and a sink device, according to an embodiment.

FIG. 4 is a signal sequence diagram 400 illustrating an example process of establishing a connection between a source device 401 and a sink device 402, according to an embodiment.

According to an embodiment, to establish a communication connection between the source device 401 (e.g., an electronic device 10 of FIG. 1) and the sink device 402 (e.g., an external electronic device 30 of FIG. 1), the source device 401 may process a capability negotiation process with the sink device 402.

The source device 401 and the sink device 402 may perform device discover operation 410 for discovering a device. When the sink device 402 is discovered, the source device 401 may perform operation 420 of setting up a connection between the source device 401 and the sink device 402. For example, and without limitation, the source device 401 may set up a Wi-Fi direct connection or an optional tunneled direct link setup (TDLS) connection with the sink device 402.

When the connection between the source device 401 and the sink device 402 is set up, the source device 401 may perform a capability negotiation process (e.g., 430, 440, 450, 460 and 470 of FIG. 4) with the sink device 402. According to an embodiment, the source device 401 may perform operation 430 of exchanging a protocol (e.g., a real-time streaming protocol (RTSP)) option with the sink device 402. The source device 401 may transmit a GET_PARAMETER request 440 for the protocol to the sink device 402. Furthermore, the source device 401 may receive a response 450 to the GET_PARAMETER request 440 and may transmit a SET_PARAMETER request 460 to the sink device 402 to receive the response 470 to the SET_PARAMETER request 460.

The source device 401 may obtain environment information associated with playing a video of the sink device 402 from the sink device 402, using the request and the response transmitted and received in the process of performing the capability negotiation process with the sink device 402.

According to an embodiment, after the capability negotiation process between the source device 401 and the sink device 402 is completed, when receiving a streaming setup request and playback request 480 from the sink device 402, the source device 401 may stream a video to the sink device 402 in operation 490. FIG. 4 is illustrative of an embodiment, and a process where the source device 401 initiates streaming may be changed. For example, the source device 401 may initiate streaming independently of a request of the sink device 402.

Figure 5:
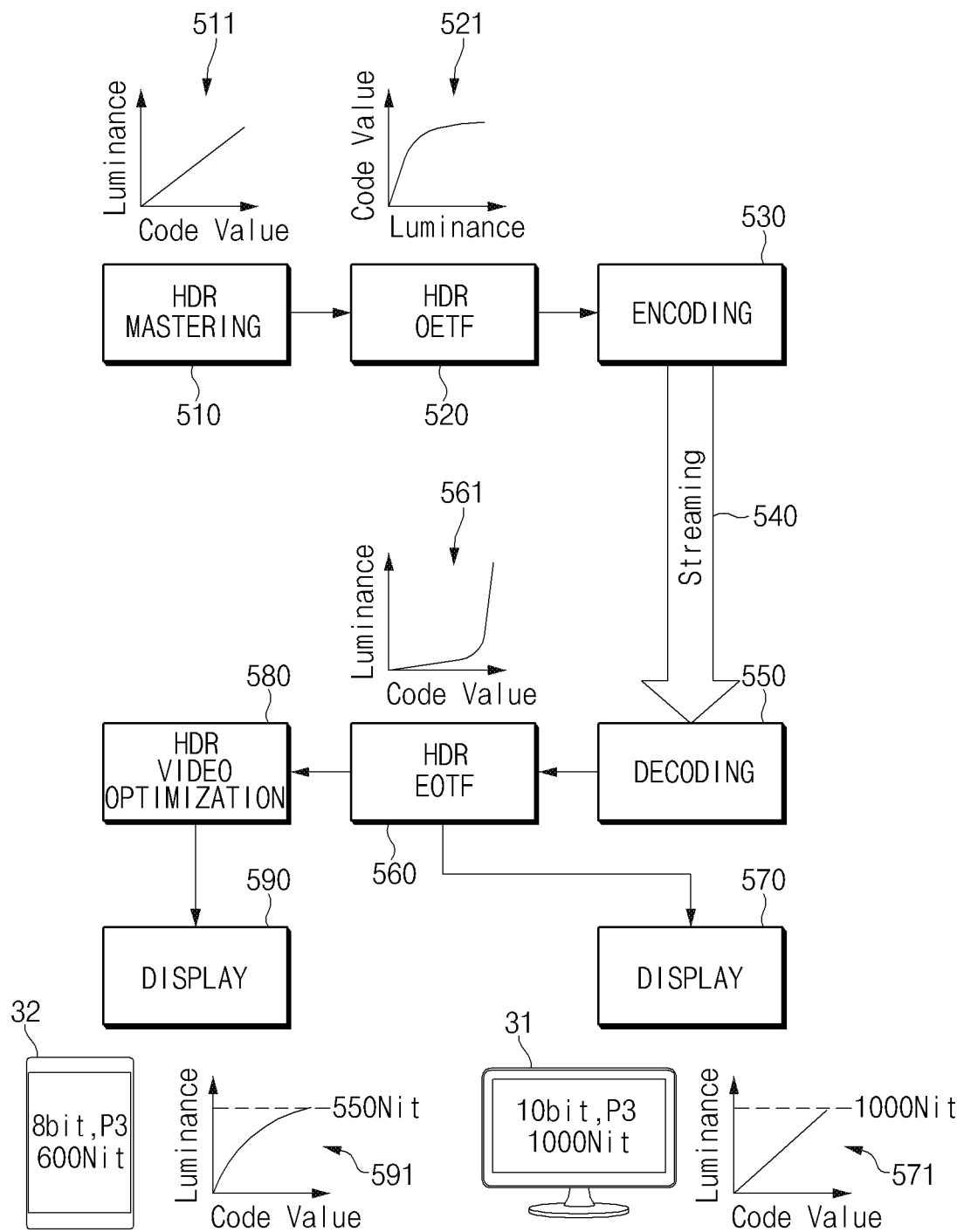
FIG. 5 is a diagram illustrating an example structure for generating and representing an HDR video, according to an embodiment.

FIG. 5 is a diagram illustrating an example structure for generating and representing an HDR video, according to an embodiment.

A device for generating an HDR video may master a video for generating the HDR video into the HDR video (reference numeral 510). According to an example shown in FIG. 5, the HDR-mastered video may have a linear relationship 511 between a code value and a luminance value. In some cases, the HDR mastering operation may be performed based on a non-linear relationship. The device for generating the HDR video may be an HDR video providing device 20 of FIG. 1 or a separate device. For example, an HDR video of 10 bits having a maximum luminance level of 1000 nits may be generated.

The HDR video represented in a linear manner may be converted into a nonlinear HDR video represented in a nonlinear manner by optical-electro transfer function (OETF) conversion 520 using an OETF 521. The nonlinear HDR video may be encoded, based on standards for streaming the HDR video, by encoding 530. For example, the HDR video may use a gamma code (e.g., an approved ST-2084 perceptual quantizer (PQ), BT-2100, HLG gamma, or the like) to stream a video and may be encoded based on a compression codec such as HEVC or VP9 to be streamed to an electronic device 10 of FIG. 1 (reference numeral 540).

The electronic device 10 may decode the streamed HDR video (reference numeral 550). Furthermore, after decoding the HDR video, the electronic device 10 may perform electro-optical transfer function (EOTF) conversion 560 using an EOTF 561 to linearize the nonlinear HDR video.

When the electronic device 10 wants to output an HDR video on an external electronic device 31 which supports an environment capable of playing the HDR video (e.g., an external electronic device which has a display, capable of playing a video of 10 bits when playing an HDR video with a maximum luminance level of 1000 nits, having a maximum luminance of 1000 nits), it may play the HDR video without a video optimization work for the HDR video.

However, in some cases, when the HDR video is transmitted to the external electronic device 32 without change, it may be impossible to play the HDR video on an external electronic device 32. For example, when an HDR video should be transmitted in a communication mode capable of transmitting only a format of an SDR video, because a communication specification for transmitting the HDR video is not supported, it is unable to transmit the HDR video. When the external electronic device 32 has a bit depth representation capability different from the electronic device 10, for example, when it is possible for the external electronic device 32 to play only an SDR video of 8 bits, it may be impossible for the external electronic device 32 to normally play the received HDR video. When there is a difference between a maximum luminance of the external electronic device 32 and a maximum luminance level of the electronic device 10, because the electronic device 10 is able to receive an HDR video having a luminance level higher than the maximum luminance of the external electronic device 32 (e.g., when a maximum luminance level included in the HDR video received by the electronic device 10 is 1000 nits and when a maximum luminance of a display of the external electronic device 32 is 600 nits), it may be impossible for a luminance value higher than the maximum luminance of the external electronic device 32 to be normally represented. Although color representation capabilities of the electronic device 10 and the external electronic device 30 differ from each other (e.g., Rec.809 vs. PCI-P3), when the external electronic device 32 receives an HDR video of the electronic device 10 without change, it is unable to normally play the HDR video. The electronic device 10 may perform HDR video optimization operation 580 for optimizing the HDR video in a playback environment of the external electronic device 30 and display the video 590. In the process of performing video optimization operation 580 for the HDR video, the electronic device 10 may use environment information received from the external electronic device 32. According to an embodiment, HDR video optimization operation 580 may include a process of performing color conversion based on the environment information.

Figure 6:
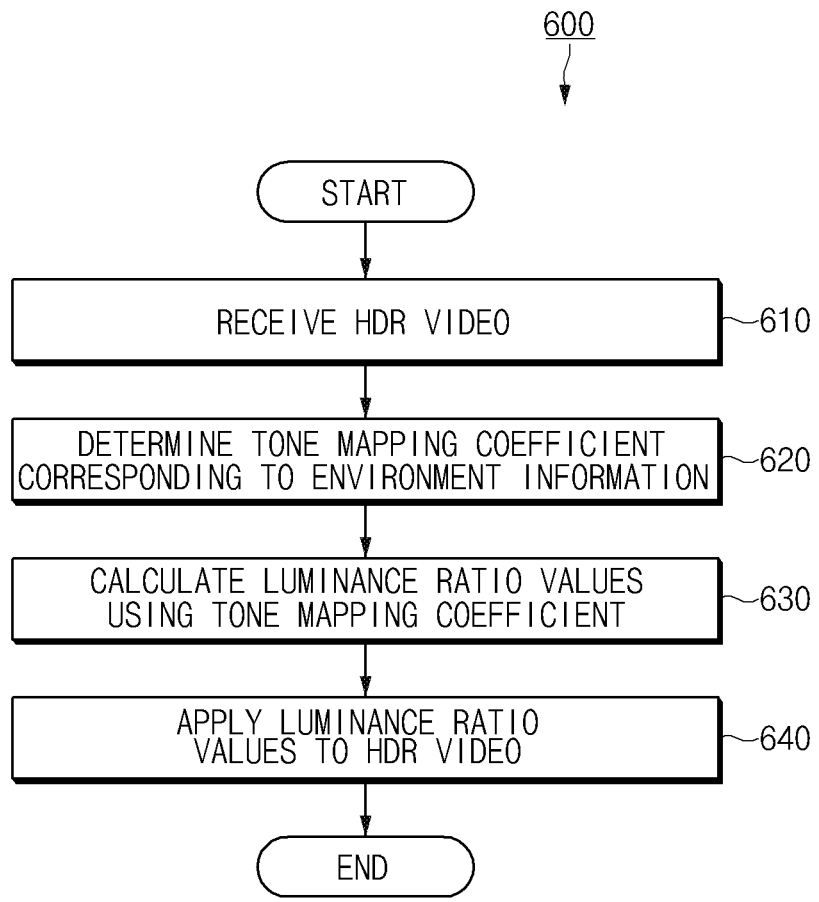
FIG. 6 is a flowchart illustrating an example process of performing color conversion, according to an embodiment.

FIG. 6 is a flowchart 600 illustrating an example process of performing color conversion, according to an embodiment.

According to an embodiment, an electronic device 10 of FIG. 1 may perform operation 610 of receiving an HDR video including an HDR image from an HDR video providing device 20 of FIG. 1. According to another embodiment, the electronic device 10 may select an HDR video stored in the electronic device 10.

The electronic device 10 may perform operation 620 of determining a tone mapping coefficient for performing tone mapping of the HDR image. The tone mapping coefficient may be determined in response to environment information.

According to an embodiment, the electronic device 10 may further determine a color conversion coefficient for performing color conversion of a video based on the environment information in operation 620. According to an embodiment, the electronic device 10 may determine a color conversion coefficient based on color information of the HDR image and color information included in the environment information.

The electronic device 10 may perform operation 630 of calculating luminance ratio values for the HDR image using the tone mapping coefficient. The electronic device 10 may apply the determined luminance ratio values to the HDR image in operation 640 to obtain an HDR video including the tone-mapped image.

Figure 7:
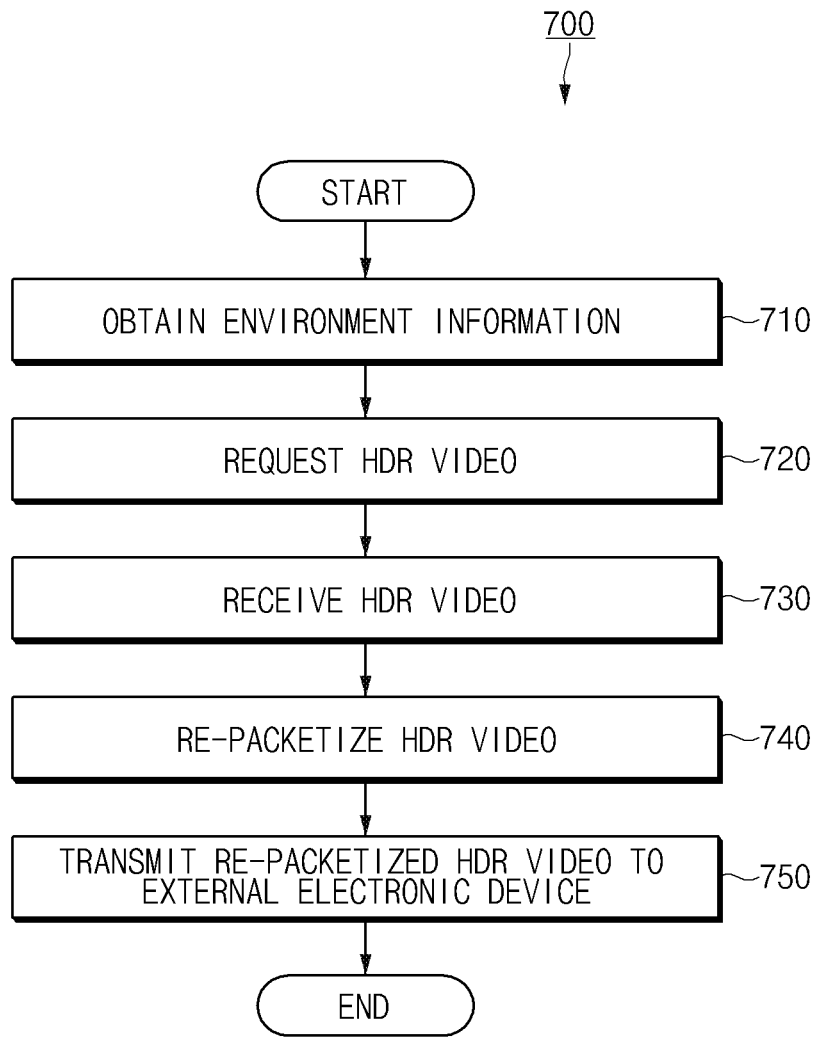
FIG. 7 is a flowchart illustrating an example process of playing an HDR video, according to another embodiment.
Figure 8:
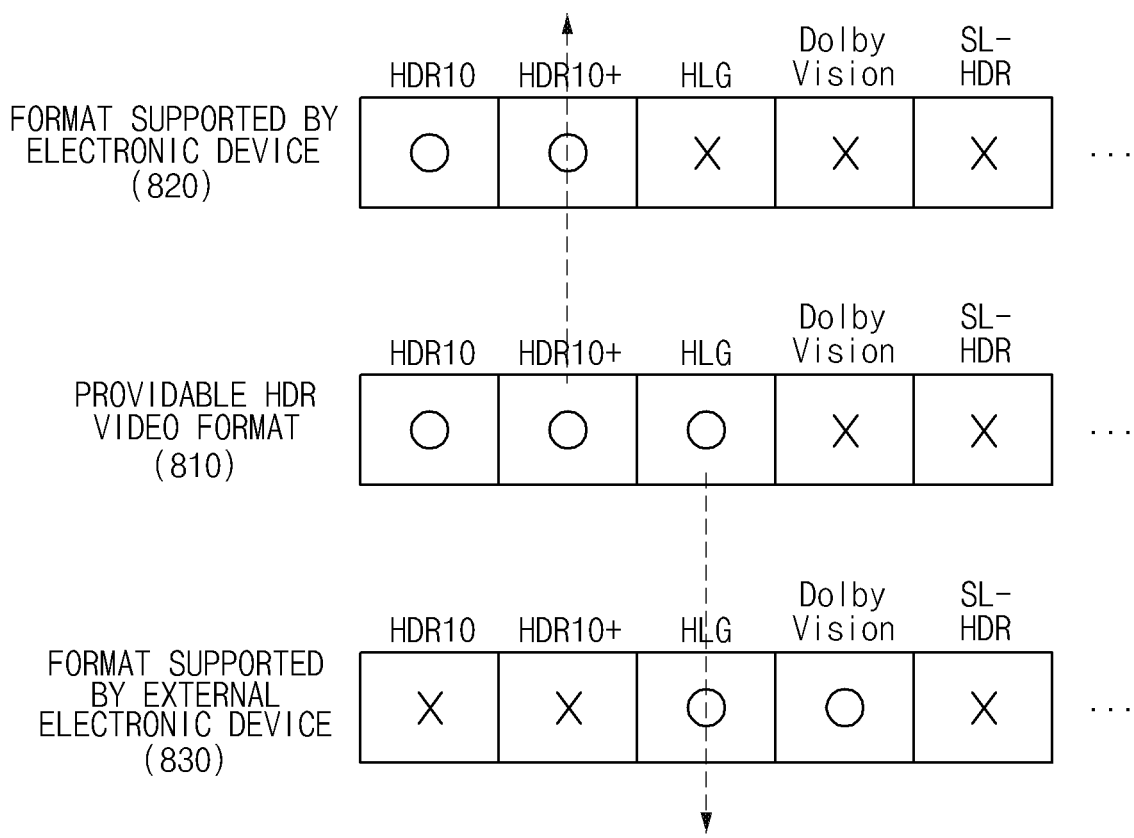
FIG. 8 is a diagram illustrating an example method for determining a format of a provided HDR image, according to an embodiment.

FIG. 7 is a flowchart 700 illustrating an example process of playing an HDR video, according to another embodiment. For example, FIG. 7 illustrates an embodiment in which an electronic device 10 is able to transmit an HDR video to an external electronic device 30 using an HDR format. FIG. 8 is a diagram illustrating an example method for determining a format of a provided HDR image, according to an embodiment.

The electronic device 10 may perform operation 710 of obtaining environment information from an external electronic device. According to an embodiment, the environment information may include information about an HDR format supported by the external electronic device. The electronic device 10 may perform operation 720 of requesting an HDR video from an HDR video providing device 20 of FIG. 1.

According to an embodiment, in operation 720, the electronic device 10 may request the HDR video from the HDR video providing device 20 based on the environment information. Referring to FIG. 8, an embodiment is illustrated by way of example as HDR video formats 810 providable by the HDR video providing device 20 are HDR10, HDR10+, and HLG. The HDR video providing device 20 may provide an HDR video to the electronic device 10 using a format included in HDR video formats providable among formats 820 supported by the electronic device. Referring to FIG. 8, when the electronic device 10 provides a device description of the electronic device 10 to the HDR video providing device 20, the HDR video providing device 20 may select one of HDR10 and HDR10+ included in all the formats 820 supported by the electronic device and the providable HDR video formats 810. Furthermore, a video provided by the HDR video providing device 20 may be selected with regard to compatibility between HDR formats. For example, an HDR format may be selected considering that it is able to play a video of the HDR10+ format in a device which supports HDR10 and does not support HDR10+. The HDR video providing device 20 may provide an HDR video configured with the selected format to the electronic device 10. When a selectable format is plural in number, the HDR video providing device 20 may select one in order of priority. For example, the device description may further include information about priorities of the formats 820 supported by the electronic device.

Referring to FIG. 8, when HDR10+ has a high priority, the HDR video providing device 20 may provide an HDR video configured based on the HDR10+ format to the electronic device 10. However, as shown in FIG. 8, when formats 830 supported by the external electronic device do not include HDR10 and HDR10+, although the electronic device 10 transmits an HDR video to the external electronic device 30, the external electronic device 30 is unable to represent the HDR video. Thus, the electronic device 10 may provide information about the formats 830 supported by the external electronic device, included in the environment information, to the HDR video providing device 20. For example, when providing the device description of the electronic device 10 to the HDR video providing device 20, the electronic device 10 may change information associated with playing an HDR video, included in the device description, to information about the external electronic device 30 and may transmit the changed information to the external electronic device 30. According to an example shown in FIG. 8, the electronic device 10 may request an HDR video of the HLG format, which is not supported by the electronic device 10 and is supported by the external electronic device 30, from the HDR video providing device 20 and may receive the HDR video of the HLG format from the HDR video providing device 20.

Referring again to FIG. 7, the electronic device 10 may perform operation 730 of receiving an HDR video as a response to the request in operation 720. The electronic device 10 may perform operation 740 of re-packetizing the received HDR video. Operation 740 may include an operation of packetizing data again to transmit the HDR video depending on requirements required by a format of the received HDR video and a communication connection protocol between the electronic device 10 and the external electronic device 30. The electronic device 10 may control its communication circuitry to perform operation 750 of transmitting the re-packetized HDR video to the external electronic device 30.

Figure 9:
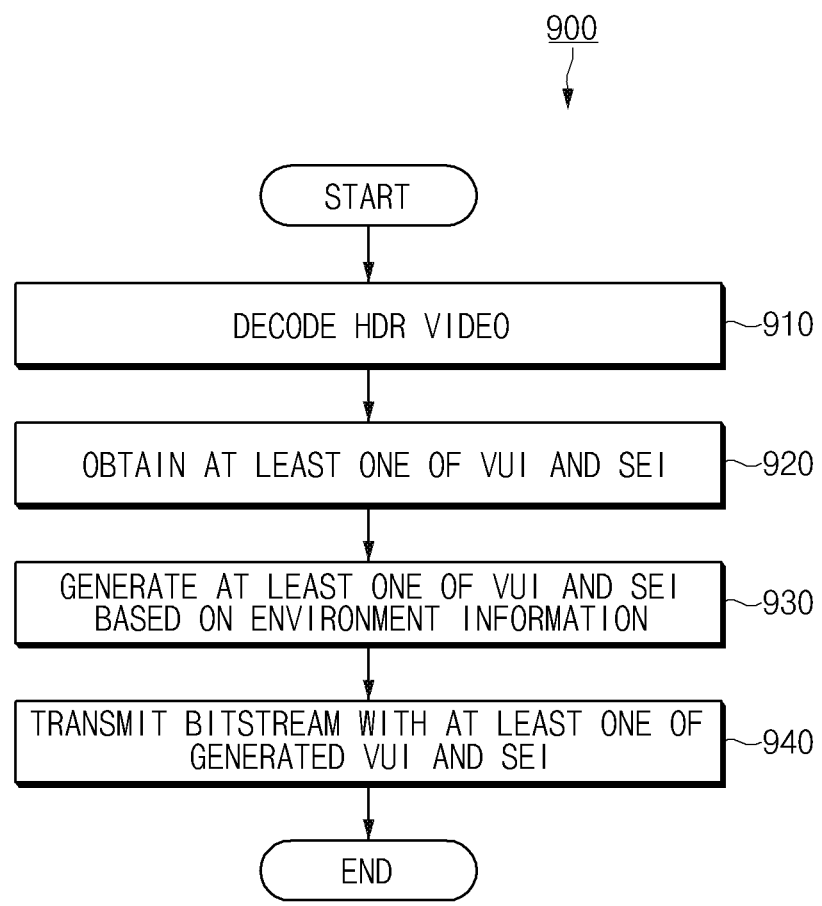
FIG. 9 is a flowchart illustrating an example process of transmitting a bitstream including video usability information (VUI) and supplemental enhancement information (SEI) according to an external electronic device, according to an embodiment.
Figure 10:
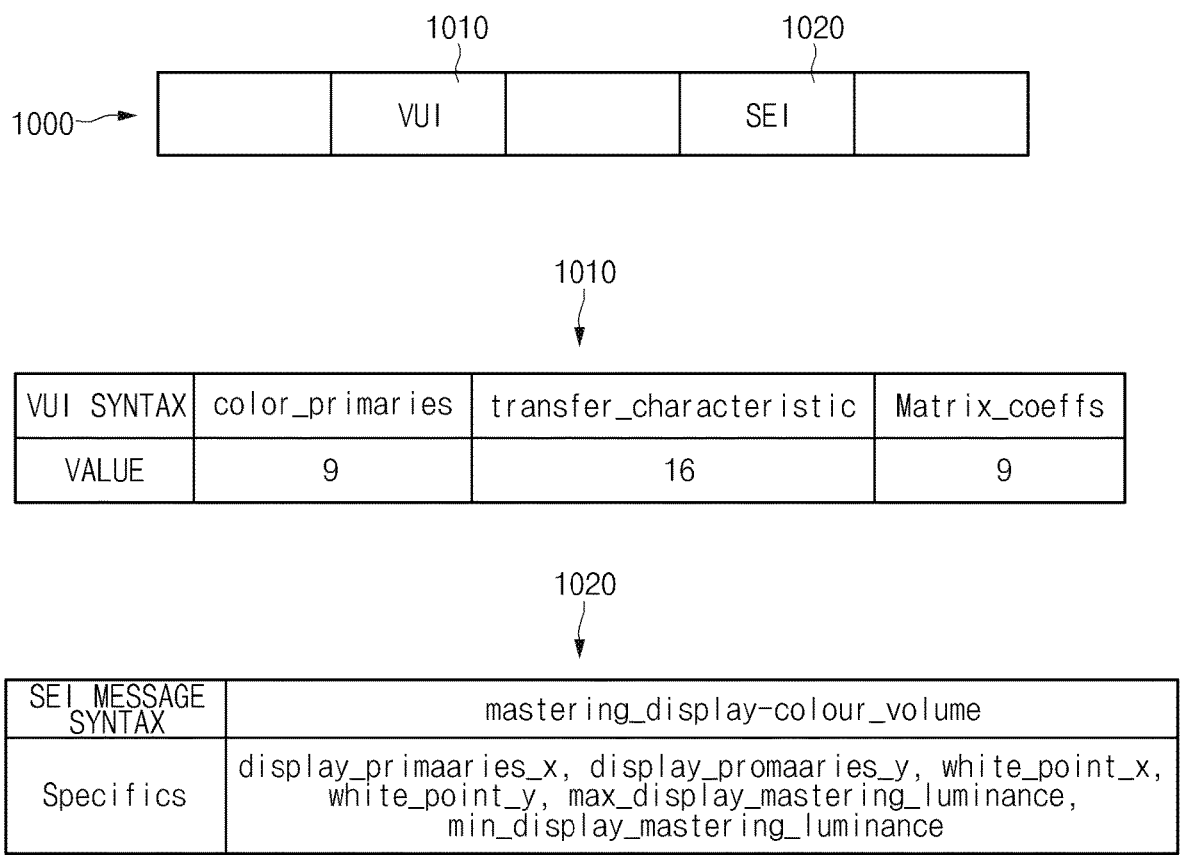
FIG. 10 is a diagram illustrating an example of VUI and SEI included in a bitstream, according to an embodiment.

FIG. 9 is a flowchart 900 illustrating an example process of transmitting a bitstream including VUI and SEI according to an external electronic device 30, according to an embodiment. FIG. 10 is a diagram illustrating an example of VUI and SEI included in a bitstream 1000, according to an embodiment.

According to an embodiment, an electronic device 10 of FIG. 1 may perform operation 910 of decoding a received HDR video. The electronic device 10 may perform operation 920 of obtaining at least one of VUI and SEI about an HDR video from the decoded HDR video. Referring to at least one of the VUI and the SEI, the electronic device 10 may recognize whether the HDR video is a video according to any specification.

Referring to FIG. 10, syntax indicating VUI 1010 and syntax indicating SEI 1020 may be included in the bitstream 1000 according to the HEVC specification for transmitting an HDR video. According to an example shown in FIG. 10, the VUI 1010 may be represented by syntax elements such as color_primaries, transfer_characteristic, and Matrix_coeffs and the syntax elements may have values such as 9, 16, and 9, respectively. Furthermore, the SEI 1020 may indicate information about a maximum luminance level or the like in max_display_mastering_luminance or the like, in connection to a message syntax element such as mastring_display_colour_volume.

For example, the transfer_characteristic value may have a value of 16 for a PQ format and may have a value of 18 for an HLG format.

When the electronic device 10 transmits a bitstream including VUI and SEI corresponding to a value of an HDR specification which is not supported by the external electronic device 30 to the external electronic device 30, the external electronic device 30 may determine that the received bitstream is configured with a format unsupportable by the external electronic device 30 and may output an error message rather than playing an HDR video. Thus, referring again to FIG. 9, the electronic device 10 may perform operation 930 of generating at least one of VUI and SEI corresponding to a video supportable by the external electronic device 30 based on the environment information received from the external electronic device 30. The electronic device 10 may control its communication circuitry to perform operation 940 of transmitting a bitstream with the at least generated one of the VUI and the SEI to the external electronic device 30.

Figure 11:
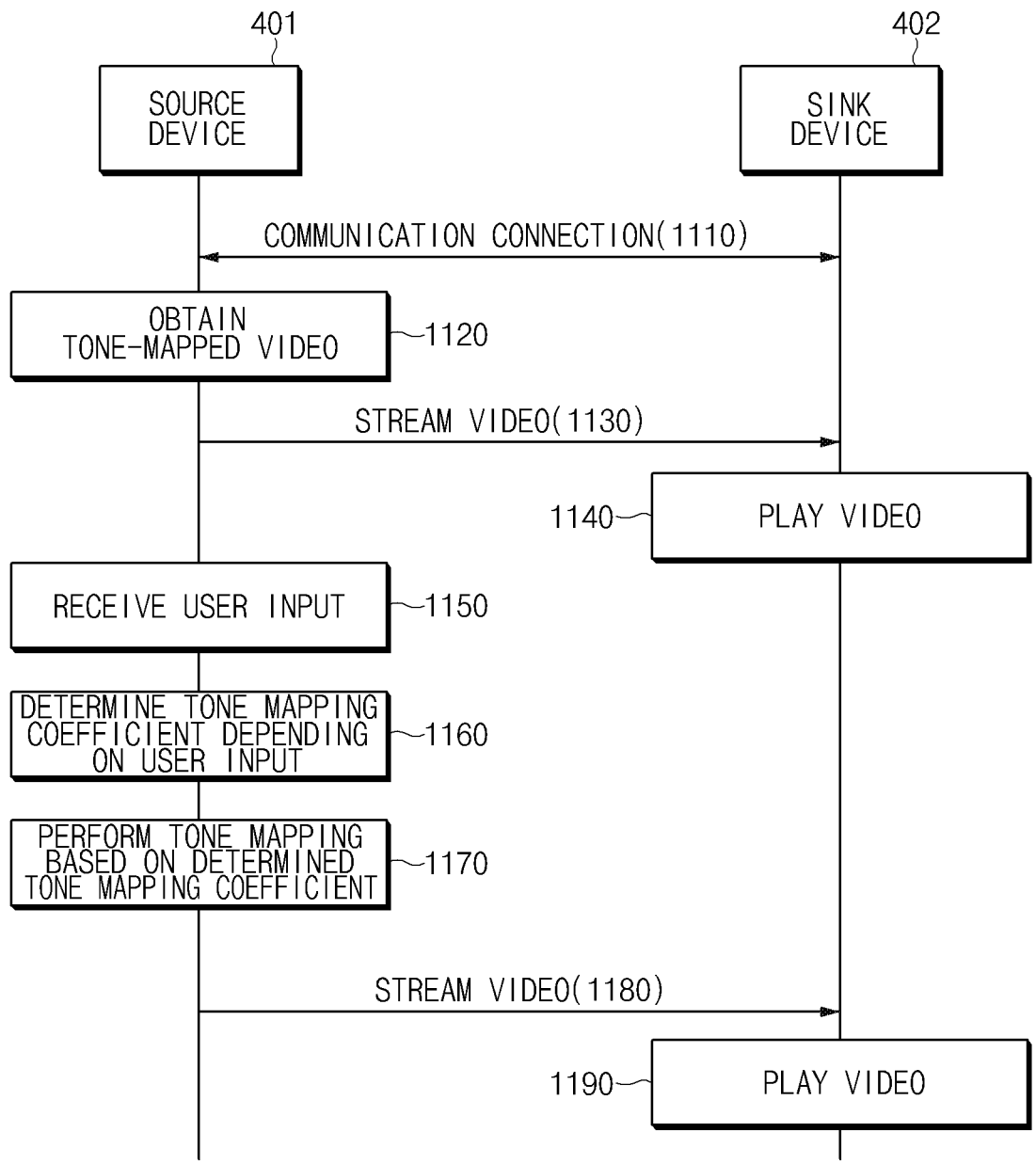
FIG. 11 is a signal sequence diagram illustrating an example process of performing tone mapping depending on a user input, according to an embodiment.

FIG. 11 is a signal sequence diagram illustrating an example process of performing tone mapping depending on a user input, according to an embodiment.

According to an embodiment, a source device 401 may perform operation 1110 of establishing a connection with a sink device 402. The source device 401 may perform operation 1120 of obtaining a video including a tone-mapped image to be streamed to the sink device 402.

When the source device 401 streams the obtained video to the sink device 402 in operation 1130, in operation 1140, the sink device 402 may play the streamed video.

According to an embodiment, in the state where the sink device 402 plays the video in operation 1140, in operation 1150, the source device 401 may receive a user input to the played video. The source device 401 may display a user interface for receiving the user input. For example, the source device 401 may output a visual image object for adjusting or selecting a tone mapping coefficient on a display provided in the source device 401 or a display provided in the sink device 402. The source device 401 may receive a user input via an input device (e.g., a touch screen display, a physical button, or the like) provided in the source device 401.

According to another embodiment, rather than operation 1150, the sink device 402 may receive a user input and may transmit the received user input to the source device 401.

The source device 401 may perform operation 1160 of determining a tone mapping coefficient depending on the user input. In operation 1170, the source device 401 may perform tone mapping based on the tone mapping coefficient determined in response to the user input. In operation 1180, the source device 401 may stream a video including the tone-mapped image to the sink device 402 based on the changed tone mapping coefficient. The sink device 402 may perform operation 1190 of playing the video including the tone-mapped image in response to the user input.

Figure 12:
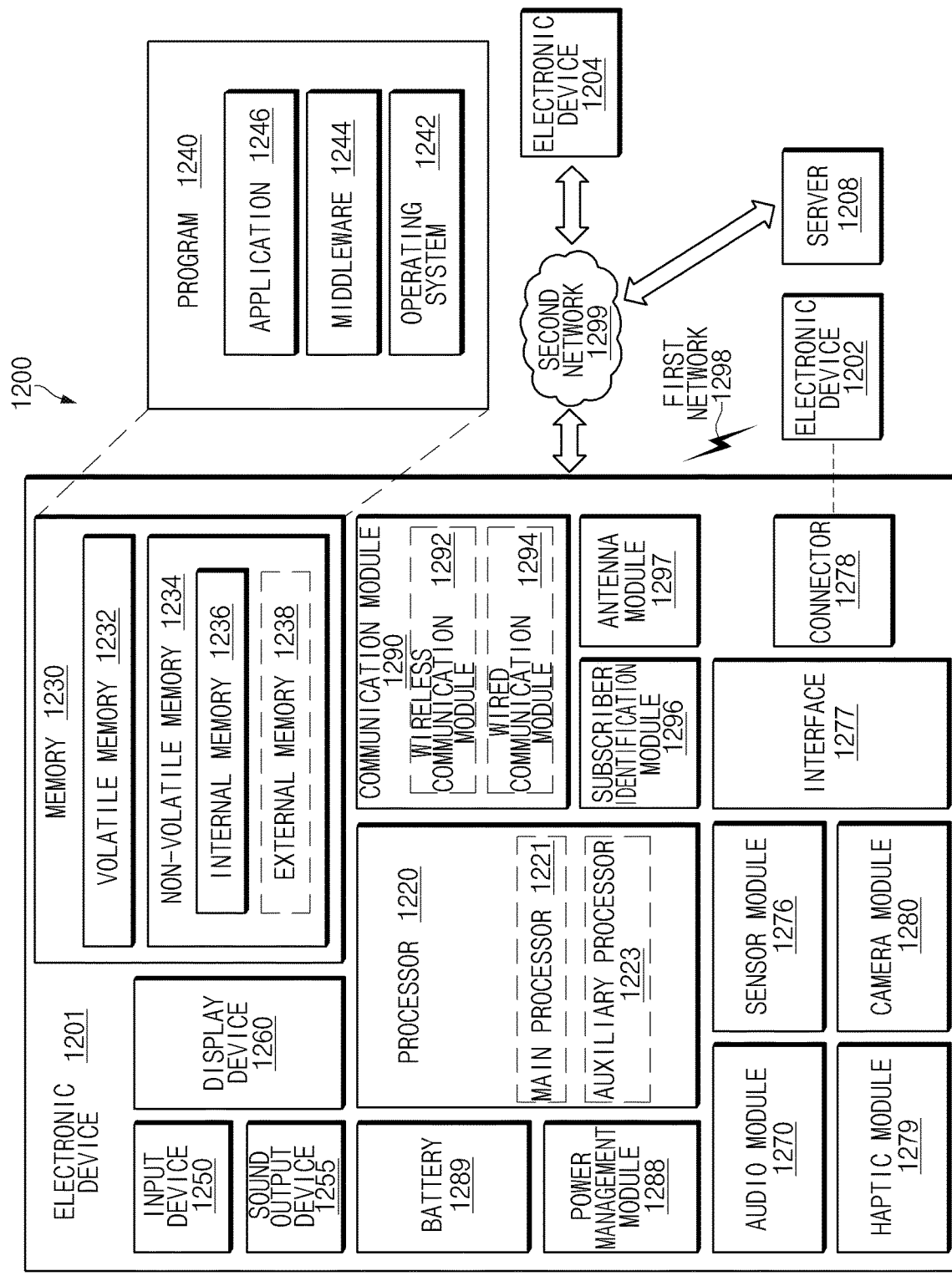
FIG. 12 is a block diagram illustrating an example electronic device in a network environment according to various embodiments.

FIG. 12 is a block diagram illustrating an example electronic device 1201 (e.g., the electronic device 10 of FIG. 1) in a network environment 1200 according to various embodiments. Referring to FIG. 12, the electronic device 1201 (e.g., the electronic device 100 in FIG. 1) may communicate with an electronic device 1202 (e.g., the external electronic device 30 of FIG. 1) through a first network 1298 (e.g., a short-range wireless communication network) or may communicate with an electronic device 1204 or a server 1208 (e.g., the HDR video providing device 20 of FIG. 1) through a second network 1299 (e.g., a long-distance wireless communication network) in the network environment 1200. According to an embodiment, the electronic device 1201 may communicate with the electronic device 1204 through the server 1208. According to an embodiment, the electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module 1296, or an antenna module 1297. According to some embodiments, at least one (e.g., the display device 1260 or the camera module 1280) among components of the electronic device 1201 may be omitted or one or more other components may be added to the electronic device 1201. According to some embodiments, some of the above components may be implemented with one integrated circuit. For example, the sensor module 1276 (e.g., a fingerprint sensor, an iris sensor, or an illuminance sensor) may be embedded in the display device 1260 (e.g., a display).

The processor 1220 may execute, for example, software (e.g., a program 1240) to control at least one of other components (e.g., a hardware or software component) of the electronic device 1201 connected to the processor 1220 and may process or compute a variety of data. According to an embodiment, as a part of data processing or operation, the processor 1220 may load a command set or data, which is received from other components (e.g., the sensor module 1276 or the communication module 1290), into a volatile memory 1232, may process the command or data loaded into the volatile memory 1232, and may store result data into a nonvolatile memory 1234. According to an embodiment, the processor 1220 may include a main processor 1221 (e.g., a central processing unit or an application processor) and an auxiliary processor 1223 (e.g., a graphic processing device, an image signal processor, a sensor hub processor, or a communication processor), which operates independently from the main processor 1221 or with the main processor 1221. Additionally or alternatively, the auxiliary processor 1223 may use less power than the main processor 1221, or is specified to a designated function. The auxiliary processor 1223 may be implemented separately from the main processor 1221 or as a part thereof.

The auxiliary processor 1223 may control, for example, at least some of functions or states associated with at least one component (e.g., the display device 1260, the sensor module 1276, or the communication module 1290) among the components of the electronic device 1201 instead of the main processor 1221 while the main processor 1221 is in an inactive (e.g., sleep) state or together with the main processor 1221 while the main processor 1221 is in an active (e.g., an application execution) state. According to an embodiment, the auxiliary processor 1223 (e.g., the image signal processor or the communication processor) may be implemented as a part of another component (e.g., the camera module 1280 or the communication module 1290) that is functionally related to the auxiliary processor 1223.

The memory 1230 may store a variety of data used by at least one component (e.g., the processor 1220 or the sensor module 1276) of the electronic device 1201. For example, data may include software (e.g., the program 1240) and input data or output data with respect to commands associated with the software. The memory 1230 may include the volatile memory 1232 or the nonvolatile memory 1234.

The program 1240 may be stored in the memory 1230 as software and may include, for example, an operating system 1242, a middleware 1244, or an application 1246.

The input device 1250 may receive a command or data, which is used for a component (e.g., the processor 1220) of the electronic device 1201, from an outside (e.g., a user) of the electronic device 1201. The input device 1250 may include, for example, a microphone, a mouse, a keyboard, or a digital pen (e.g., a stylus pen).

The sound output device 1255 may output a sound signal to the outside of the electronic device 1201. The sound output device 1255 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 1260 may visually provide information to the outside (e.g., the user) of the electronic device 1201. For example, the display device 1260 may include a display, a hologram device, or a projector and a control circuit for controlling a corresponding device. According to an embodiment, the display device 1260 may include a touch circuitry configured to sense the touch or a sensor circuit (e.g., a pressure sensor) for measuring an intensity of pressure on the touch.

The audio module 1270 may convert a sound and an electrical signal in dual directions. According to an embodiment, the audio module 1270 may obtain the sound through the input device 1250 or may output the sound through the sound output device 1255 or an external electronic device (e.g., the electronic device 1202 (e.g., a speaker or a headphone)) directly or wirelessly connected to the electronic device 1201.

The sensor module 1276 may generate an electrical signal or a data value corresponding to an operating state (e.g., power or temperature) inside or an environmental state (e.g., a user state) outside the electronic device 1201. According to an embodiment, the sensor module 1276 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1277 may support one or more designated protocols to allow the electronic device 1201 to connect directly or wirelessly to the external electronic device (e.g., the electronic device 1202). According to an embodiment, the interface 1277 may include, for example, an HDMI (high-definition multimedia interface), a USB (universal serial bus) interface, an SD card interface, or an audio interface.

A connecting terminal 1278 may include a connector that physically connects the electronic device 1201 to the external electronic device (e.g., the electronic device 1202). According to an embodiment, the connecting terminal 1278 may include, for example, an HDMI connector, a USB connector, an SD card connector, or an audio connector (e.g., a headphone connector).

The haptic module 1279 may convert an electrical signal to a mechanical stimulation (e.g., vibration or movement) or an electrical stimulation perceived by the user through tactile or kinesthetic sensations. According to an embodiment, the haptic module 1279 may include, for example, a motor, a piezoelectric element, or an electric stimulator.

The camera module 1280 may shoot a still image or a video image. According to an embodiment, the camera module 1280 may include, for example, at least one or more lenses, image sensors, image signal processors, or flashes.

The power management module 1288 may manage power supplied to the electronic device 1201. According to an embodiment, the power management module 1288 may be implemented as at least a part of a power management integrated circuit (PMIC).

The battery 1289 may supply power to at least one component of the electronic device 1201. According to an embodiment, the battery 1289 may include, for example, a non-rechargeable (primary) battery, a rechargeable (secondary) battery, or a fuel cell.

The communication module 1290 may establish a direct (e.g., wired) or wireless communication channel between the electronic device 1201 and the external electronic device (e.g., the electronic device 1202, the electronic device 1204, or the server 1208) and support communication execution through the established communication channel. The communication module 1290 may include at least one communication processor operating independently from the processor 1220 (e.g., the application processor) and supporting the direct (e.g., wired) communication or the wireless communication. According to an embodiment, the communication module 1290 may include a wireless communication module 1292 (e.g., a cellular communication module, a short-range wireless communication module, or a GNSS (global navigation satellite system) communication module) or a wired communication module 1294 (e.g., an LAN (local area network) communication module or a power line communication module). The corresponding communication module among the above communication modules may communicate with the external electronic device through the first network 1298 (e.g., the short-range communication network such as a Bluetooth, a WiFi direct, or an IrDA (infrared data association)) or the second network 1299 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 1292 may identify and authenticate the electronic device 1201 using user information (e.g., international mobile subscriber identity (IMSI)) stored in the subscriber identification module 1296 in the communication network, such as the first network 1298 or the second network 1299.

The antenna module 1297 may transmit or receive a signal or power to or from the outside (e.g., the external electronic device). According to an embodiment, the antenna module may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1201 and the external electronic device 1204 through the server 1208 connected to the second network 1299. Each of the electronic devices 1202 and 1204 may be the same or different types as or from the electronic device 1201. According to an embodiment, all or some of the operations performed by the electronic device 1201 may be performed by one or more external electronic devices among the external electronic devices 1202, 1204, or 1208. For example, when the electronic device 1201 performs some functions or services automatically or by request from a user or another device, the electronic device 1201 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1201. The electronic device 1201 may provide the result as is or after additional processing as at least a part of the response to the request. To this end, for example, a cloud computing, distributed computing, or client-server computing technology may be used.

Figure 13:
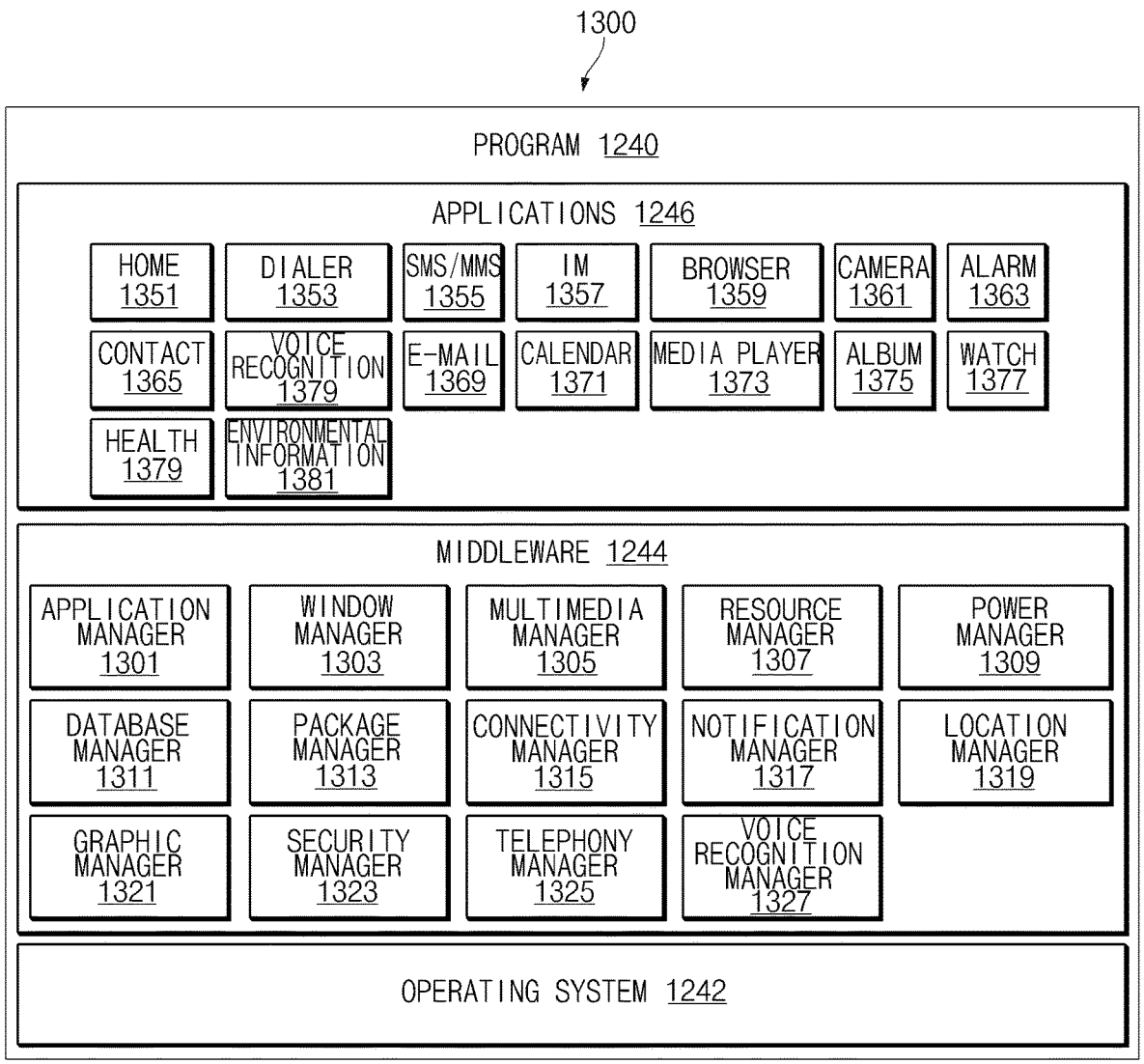
FIG. 13 is a block diagram illustrating an example program according to various embodiments.

FIG. 13 is a block diagram 1300 illustrating an example program 1240 according to various embodiments. According to an embodiment, the program 1240 may include an operating system (OS) for controlling one or more resources of an electronic device 1201 of FIG. 12, middleware 1244, and an application 1246 executable by the OS 1242. The OS 1242 may include, for example, Android™, iOS™, Windows™, Symbian™, Tizen™, or Bada™. For example, at least a portion of the program 1240 may be preloaded on the electronic device 1201 when the electronic device 1201 is manufactured or may be downloaded and updated from an external electronic device (e.g., an electronic device 1202 or 1204 or a server 1208 of FIG. 12) when the electronic device 1201 is used by a user.

The OS 1242 may control to manage (e.g., assign or collect) one or more system resources (e.g., a process, a memory, or a power supply) of the electronic device 1201. Additionally or alternatively, the OS 1242 may include one or more driver programs for driving another hardware device of the electronic device 1201, for example, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module 1296, or an antenna module 1297 of FIG. 12.

The middleware 1244 may provide various functions to the application 1246 such that functions or information provided from one or more resources of the electronic device 1201 may be used by the application 1246. The middleware 1244 may include, for example, an application manager 1301, a window manager 1303, a multimedia manager 1305, a resource manager 1307, a power manager 1309, a database manager 1311, a package manager 1313, a connectivity manager 1315, a notification manager 1317, a location manager 1319, a graphic manager 1321, a security manager 1323, a telephony manager 1325, or a voice recognition manager 1327.

The application manager 1301 may manage, for example, a life cycle of the application 1246. The window manager 1303 may manage, for example, one or more graphic user interface (GUI) resources used in a screen. The multimedia manager 1305 may identify, for example, one or more formats necessary for playing media files and may encode or decode a corresponding media file among the media files using a codec suitable for the format selected among the one or more formats. The resource manager 1307 may manage, for example, a source code of the application 1246 or a space of a memory 1230 of FIG. 12. The power manager 1309 may manage, for example, capacity, temperature, or power of the battery 1289 and may determine or provide information associated with an operation of the electronic device 1201 using the corresponding information among the capacity, the temperature, or the power of the battery 1289. According to an embodiment, the power manager 1309 may interwork with a basic input/output system (BIOS) (not shown) of the electronic device 1201.

The database manager 1311 may generate, search, or modify a database to be used by the application 1246. The package manager 1313 may manage to install or update, for example, an application distributed in the form of a package file. The connectivity manager 1315 may manage, for example, a wireless connection or a direct connection between the electronic device 1201 and the external electronic device. The notification manager 1317 may provide, for example, a function for notifying a user that a specified event (e.g., an incoming call, a message, or an alarm) occurs. The location manager 1319 may manage, for example, location information of the electronic device 1201. The graphic manager 1321 may manage, for example, one or more graphic effects to be provided to the user or may manage a UI associated with the graphic effects.

The security manager 1323 may provide, for example, system security or user authentication. The telephony manager 1325 may manage, for example, a voice or video call function provided by the electronic device 1201. The speech recognition manager 1327 may transmit, for example, voice data of the user to a server 1208 of FIG. 12 and may receive a command corresponding to a function to be performed in the electronic device 1201 based in part on the voice data or text data converted based in part on the voice data from the server 1208. According to an embodiment, the middleware 1244 may dynamically fail to include some of the existing components or may further include new components. According to an embodiment, at least a portion of the middleware 1244 may be included as a portion of the OS 1242 or may be implemented as software independent of the OS 1242.

The application 1246 may include, for example, a home application 1351, a dialer application 1353, an SMS/MMS application 1355, an instant message (IM) application 1357, a browser application 1359, a camera application 1361, an alarm application 1363, a contact application 1365, a speed recognition application 1367, an e-mail application 1369, a calendar application 1371, a media player application 1373, an album application 1375, a watch application 1377, a health application 1379 (e.g., an application for measuring biometric information such as an exercise quantity or blood sugar), or an environmental information application 1381 (e.g., an application for measuring information about barometric pressure, humidity, or temperature). According to an embodiment, the application 1246 may further include an information exchanging application (not shown) capable of supporting information exchange between the electronic device 1201 and the external electronic device. The information exchanging application may include, for example, a notification relay application configured to transmit specific information (e.g., a call, a message, or an alarm) to the external electronic device or a device management application configured to manage the external electronic device. For example, the notification relay application may transmit notification information corresponding to a specified event (e.g., mail reception) which occurs in another application (e.g., the e-mail application 1369) of the electronic device 1201 to the external electronic device. Additionally or alternatively, the notification relay application may receive notification information from the external electronic device and may provide the received notification information to a user of the electronic device 1201.

The device management application may control, for example, a power (e.g., turn-on/turn-off of the power) of the external electronic device which communicates with the electronic device 1201 and a power of each of some (e.g., a display device 1260 or a camera module 1280) of the components of the electronic device 1201 or may control a function (e.g., brightness, resolution, or focus) of each of some (e.g., the display device 1260 or the camera module 1280) of the components of the electronic device 1201. Additionally or alternatively, the device management application may support to install, delete, or update an application which operates in the external electronic device.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 1240) including an instruction stored in a machine-readable storage medium (e.g., an internal memory 1236 or an external memory 1238) readable by a machine (e.g., the electronic device 1201). For example, the processor (e.g., the processor 1220) of a machine (e.g., the electronic device 1201) may call the instruction from the machine-readable storage medium and execute the instructions thus called. The machine may perform at least one function based on the called at least one instruction. The one or more instructions may include a code generated by a compiler or executable by an interpreter. The machine-readable storage medium may be provided in the form of non-transitory storage medium. Here, the "non-transitory" storage medium is tangible, but may not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to embodiments disclosed in the present disclosure, the method for providing the HDR video and the electronic device may minimize and/or reduce a sense of difference of the user who recognizes a screen although transmitting the HDR video with an SDR format.

Furthermore, according to embodiments disclosed in the present disclosure, the electronic device may provide an HDR video using an external electronic device which supports a HDR format different from the electronic device.

In addition, various effects directly or indirectly ascertained through the disclosure may be provided.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. An electronic device, comprising:
communication circuitry;
a processor operatively connected with the communication circuitry; and
a memory operatively connected with the processor,
wherein the memory is configured to store instructions which, when executed, cause the processor to control the electronic device to:
establish a first communication connection with a server;
receive a high dynamic range (HDR) video streamed from the server using the first communication connection;
establish a second communication connection with an external electronic device, using the communication circuitry;
obtain environment information associated with a video playback environment of the external electronic device, using the second communication connection;
decode the high dynamic range (HDR) video streamed from the server;
determine a first tone mapping coefficient based on the environment information;
perform first color conversion of the decoded HDR video using the first tone mapping coefficient;
encode the first color-converted video;
stream the encoded first color-converted video to the external electronic device via the second communication connection;
receive an input for changing the first tone mapping coefficient in a state of streaming the first color-converted video to the external electronic device;
perform second color conversion of the decoded HDR video using a second tone mapping coefficient determined, based on the input;
encode the second color-converted video; and
stream the encoded second color-converted video to the external electronic device via the second communication connection,
wherein the HDR video streamed from the server comprises first information corresponding to a first HDR specification and, the instructions cause the processor, based on the environment information indicating that the external electronic device does not support the first HDR specification, to control the electronic device to generate and transmit second information to the external electronic device corresponding to a second HDR specification supported by the external electronic device, and
wherein each of the first information and the second information comprises at least one of video usability information (VUI) and supplemental enhancement information (SEI).

2. The electronic device of claim 1, wherein the environment information includes color space information about the external electronic device and information about a maximum luminance of the external electronic device.

3. The electronic device of claim 2, wherein the color space information includes color gamut information about the external electronic device and gamma information about the external electronic device.

4. The electronic device of claim 1, wherein the instructions, when executed, cause the processor to control the electronic device to:
perform a capability negotiation process for establishing the second communication connection with the external electronic device, and
wherein the capability negotiation process includes receiving the environment information from the external electronic device.

5. The electronic device of claim 1, wherein the memory stores a table associating the environment information with the first tone mapping coefficient, and
wherein the instructions, when executed, cause the processor to control the electronic device to identify the first tone mapping coefficient from the table based on the environment information.

6. A method for playing a high dynamic range (HDR) video using an external electronic device at an electronic device, the method comprising:
establishing a first communication connection with a server;

receiving a high dynamic range (HDR) video streamed from the server using the first communication connection;
establishing a second communication connection with an external electronic device, using the communication circuitry;
obtaining environment information associated with a video playback environment of the external electronic device, using the second communication connection;
decoding the HDR video streamed from the server;
determining a first tone mapping coefficient based on the environment information;
performing first color conversion of the decoded HDR video using the first tone mapping coefficient;
encoding the first color-converted video;
streaming the encoded first color-converted video to the external electronic device via the second communication connection;
receiving an input for changing the first tone mapping coefficient in a state of streaming the video to the external electronic device;
performing second color conversion of the decoded HDR video using a second tone mapping coefficient determined, based on the input;
encoding the second color-converted video; and
streaming the encoded second color-converted video to the external electronic device via the second communication connection,
wherein the HDR video streamed from the server comprises first information corresponding to a first HDR specification and the method further comprises, based on the environment information indicating that the external electronic device does not support the first HDR specification, generating and transmitting second information to the external electronic device corresponding to a second HDR specification supported by the external electronic device, and
wherein each of the first information and the second information comprises at least one of video usability information (VUI) and supplemental enhancement information (SEI).

* * * * *